United States Patent
Ohtsu et al.

[11] Patent Number: 6,142,587
[45] Date of Patent: Nov. 7, 2000

[54] ANTI-LOCK BRAKING SYSTEM

[75] Inventors: Nobuyuki Ohtsu, Kanagawa; Jun Kubo, Tokyo, both of Japan

[73] Assignee: Unisia Jecs Corporation, Atsugi, Japan

[21] Appl. No.: 09/150,048

[22] Filed: Sep. 9, 1998

[30] Foreign Application Priority Data

Sep. 9, 1997 [JP] Japan .................................. 9-244156

[51] Int. Cl.$^7$ .................................................. B60T 8/66
[52] U.S. Cl. .................. 303/167; 188/181 C; 303/170; 303/171; 303/169; 303/173
[58] Field of Search .................. 303/167, 171, 303/169, 170, 173, 199, 149, 148, 146; 701/71, 73, 74, 79, 80; 188/181 C

[56] References Cited

U.S. PATENT DOCUMENTS

| | | | |
|---|---|---|---|
| 4,991,910 | 2/1991 | Shimanuki et al. | 303/170 |
| 5,043,898 | 8/1991 | Yoshino | 303/169 |
| 5,401,082 | 3/1995 | Fuchs et al. | 303/111 |
| 5,480,217 | 1/1996 | Ohtsu | 303/167 |
| 5,498,072 | 3/1996 | Shimizu | 303/191 |
| 5,799,261 | 8/1998 | Ozaki et al. | 701/78 |
| 5,829,847 | 11/1998 | Tozu et al. | 303/167 |

FOREIGN PATENT DOCUMENTS

| | | |
|---|---|---|
| 0 680 862 | 11/1995 | European Pat. Off. . |
| 41 07 278 | 9/1992 | Germany . |
| 196 00 984 | 7/1996 | Germany . |

*Primary Examiner*—Douglas C. Butler
*Attorney, Agent, or Firm*—Foley & Lardner

[57] ABSTRACT

Anti-lock braking system for an automobile is disclosed. It includes a brake unit that can control brake pressures within wheel cylinders of each road wheels of the automobile separately. In an anti-lock control mode, a control unit is operative to determine a controlled wheel speed for a road wheel to be controlled. The control unit determines a slip of the road wheel based on the determined controlled wheel speed and activates the brake unit in a direction to decrease the determined slip. In determining the controlled wheel speed, the control unit is operative to select a higher one of actual wheel speeds of front and rear road wheels on the opposite side to the side where the road wheel to be controlled exists. Then, the control unit is operative to use, as the controlled wheel speed, a lower one of an actual wheel speed of the road wheel to be controlled and the selected higher one wheel speed.

6 Claims, 7 Drawing Sheets

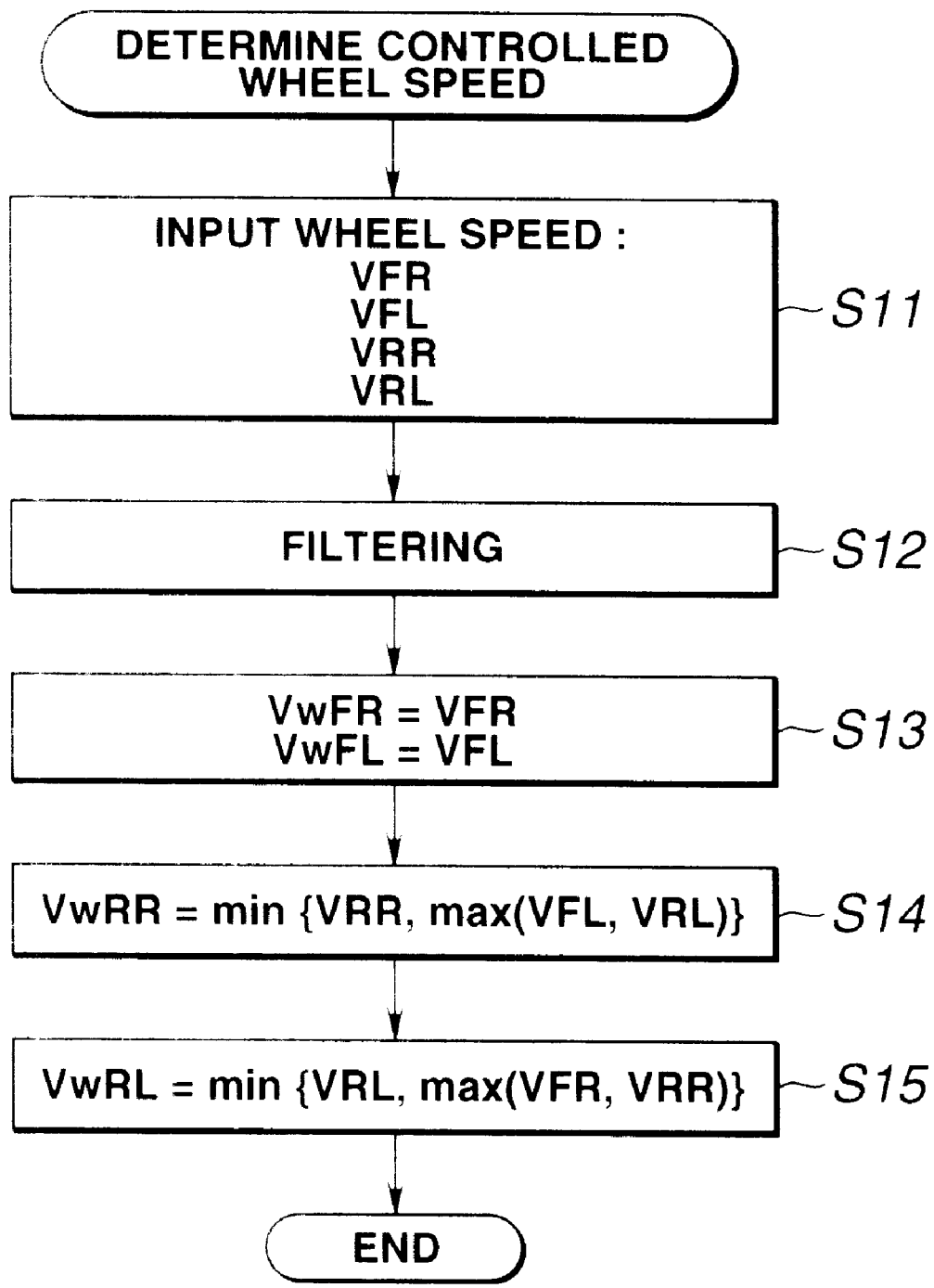

LOW μ     HIGH μ    Sf

DIRECTION OF TRAVEL

LOW μ    HIGH μ
→ Sf

↑ DIRECTION OF TRAVEL

LOW μ    HIGH μ
→ Sf

ANTI-LOCK BRAKING SYSTEM

FIELD OF THE INVENTION

The present invention relates to an anti-lock braking system for automobiles.

BACKGROUND OF THE INVENTION

U.S. Pat. No. 5,480,217 issued to Ohtsu on Jan. 2, 1996 discloses a known anti-lock braking system (ABS) for automobiles. As is so in this known ABS, it is the conventional practice to compare a wheel speed assigned to a road wheel to be controlled with a reference value, and to regulate the brake pressure in response to the result of this comparison. This wheel speed may not necessarily be equal to an actual wheel speed of the road wheel to be controlled. For making a clear distinction from the actual wheel speed, the above-mentioned wheel speed that is compared with the reference value is hereinafter named as the term "controlled wheel speed." The controlled wheel speeds for all of the road wheels are determined. These determined controlled wheel speeds are used to give a pseudo-vehicle speed that approximates an actual vehicle travelling speed. This pseudo-vehicle speed is used in determining the above-mentioned reference value. This reference value is indicative of a wheel speed, which is slightly lower than a wheel speed that corresponds to the pseudo-vehicle speed, to be accomplished for establishing the optimum braking state at the vehicle speed. The controlled wheel speed for the road wheel to be controlled is compared with the reference value. Immediately after the controlled wheel speed has exceeded the reference value, the brake pressure within the wheel cylinder is decreased, thereby suppressing the tendency of the road wheel to lock.

With regard to the manner of determining the controlled wheel speeds, there are three techniques for determining controlled wheel speeds for rear road wheels. They include a rear wheel select-low control, a rear wheel independent control, and a diagonal select-low control.

According to the rear wheel select-low control, a lower one of actual wheel speeds VRR and VRL of rear right and rear left road wheels is selected and used as a controlled wheel speed VwR for the rear road wheels.

According to the rear wheel independent control, an actual wheel speed VRR is used as a controlled wheel speed VwRR for a rear right road wheel, while an actual wheel speed VRL is used as a controlled wheel speed VwRL for a rear left road wheel.

According to the diagonal select-low control, a lower one of an actual wheel speed of a rear road wheel to be controlled and an actual wheel speed of the nonadjacent diagonally arranged front road wheel is selected and used as a controlled wheel speed for the rear road wheel.

The rear wheel select-low control has a shortcoming that appears during braking in cornering state. FIG. 7(a) illustrates, in vector, braking forces applied to each road wheels of an automobile, with an ABS employing the rear wheel select-low control, during braking in a left turn cornering state. In the cornering state illustrated in FIG. 7(a), the rear left wheel is subject less heavier load than load on the rear right wheel, so that the rear left wheel rotates at wheel speed VRL, which is lower than wheel speed VRR of the rear right wheel. In this case, according to the select-low logic, the rear left wheel speed VRL is used as a controlled wheel speed VwR for the rear wheels. The controlled wheel speed VwR that is equal to the rear left wheel speed VRL is used in controlling brake pressure within wheel cylinders of both of the rear wheels. Thus, brake force applied to the rear right wheel is the same as brake force applied to the rear left wheel as illustrated in vectors in FIG. 7(a). This braking force is high enough for allowing the rear left wheel to rotate at the reference value, which is indicative of a wheel speed that is slightly lower than the pseudo-vehicle speed. But it is not high enough to allow the rear right wheel to rotate at the reference value, thereby allowing the rear right wheel to rotate above the wheel speed that is indicated by the reference value. Thus, the rear wheel select-low control may hamper accomplishment of a reduction in braking distance during braking in cornering state.

The rear wheel independent control is free from the above-mentioned shortcoming of the rear wheel select-low control.

However, the rear wheel independent control exhibits a shortcoming during travelling of the automobile with road wheels on one side in contact with low $\mu$ road surface and road wheels on the opposite side in contact with high $\mu$ road surface. FIG. 7(b) illustrates, in vector, braking forces applied to each road wheels of an automobile, with an ABS employing the independent control, during braking when the vehicle is travelling with the left wheels on low $\mu$ road surface and the right wheels on high $\mu$ road surface. In this case, the rear right wheel has fewer tendencies to slip than the rear left wheel has. Thus, braking the rear road wheels results in applying relatively high braking force to the rear right wheel as compared to braking force applied to the rear left wheel. Application of such relatively high braking force to the rear right wheel in contact with high $\mu$ road surface will cause a reduction in cornering force Sf. The reduction in cornering force Sf may hamper accomplishment of stable behavior of the vehicle.

The diagonal select-low control is free from the above-mentioned shortcoming of the rear wheel independent control. FIG. 7(c) illustrates, in vector, braking forces applied to each road wheels of an automobile, with an ABS employing the diagonal select-low control, during braking when the vehicle is travelling with its left wheels on low $\mu$ road surface and its right wheels on high $\mu$ road surface. According to the diagonal select-low control, a lower one of an actual wheel speed of a rear road wheel to be controlled and an actual wheel speed of the nonadjacent diagonally arranged front road wheel is selected and used as a controlled wheel speed for the rear road wheel. Since the front left wheel speed VFL is lower than the rear right road wheel VRR, the front left wheel speed VFL is used as a controlled wheel speed VwRR for the rear right wheel. Thus, the braking force applied to the rear right wheel is suppressed as compared to the braking force applied to the rear right wheel illustrated in FIG. 7(b), thereby inducing a relatively large cornering force Sf as compared to that illustrated in FIG. 7(b). The cornering force Sf increases as the braking force decreases, and the former decreases as the latter increases.

Further, the diagonal select-low control is free from the shortcoming, during braking in cornering state, of the rear wheel select-low control. FIG. 7(d) illustrates, in vector, braking forces applied to each road wheels of an automobile, with an ABS employing the diagonal select-low control, during braking in a left turn cornering state. According to the diagonal select-low control, a lower one of the rear right wheel speed VRR and the front left wheel speed VFL is used as the controlled wheel speed VwRR for the rear road wheel. Thus, the rear left wheel speed VRL is no longer used as the controlled wheel speed VwRR. As VFL is higher than VRL during braking in left turn cornering state, sufficiently high braking force is ensured for the rear right wheel.

However, the diagonal select-low control shows a shortcoming during braking when the automobile is travelling in a straightforward direction. FIG. 7(e) illustrates braking forces, in vector, applied to each road wheels of an automobile, with an ABS employing the diagonal select-low control, during travelling in a straightforward direction. In this state, if the front right and left wheels are subject to slip during braking, their wheel speeds VFR and VFL decrease. According to the diagonal select-low control, the front right wheel speed VFR and front left wheel speed VFL are used as the rear right controlled wheel speed VwRR and rear left controlled wheel speed VwRL, respectively. Thus, braking forces applied to the rear road wheels may drop below a satisfactory level.

An object of the present invention is to eliminate the shortcoming of the diagonal select-low control, thereby accomplishing sufficiently high braking forces applied to each road wheels during braking when an automobile is travelling in a straightforward direction, while retaining all of the merits of the diagonal select-low control.

SUMMARY OF THE INVENTION

According to the present invention, an anti-lock braking system comprises:

a brake unit operative in response to a control signal to regulate brake pressure within a wheel cylinder of a road wheel to be controlled; and a control unit operative to apply said control signal to said brake unit, said control unit being operative to determine a controlled wheel speed for the one road wheel to be controlled, said control unit being operative to compare said controlled wheel speed with a reference value, said control unit being operative to develop said control signal in response to result from comparing said controlled wheel speed with said reference value;

wherein said control unit is operative to select a higher one of the actual wheel speeds of road wheels on the opposite side, with respect to a longitudinal center line of the automobile, to the side where the one road wheel to be controlled exists, said control unit is operative to select a lower one of said selected higher one actual wheel speed and the actual wheel speed of the one road wheel to be controlled, and said control unit is operative to set said selected lower one actual wheel speed as said controlled wheel speed.

BRIEF DESCRIPTION OF THE DRAWINGS

FIG. 5 is a flow chart of a sub-routine for determining controlled wheel speeds.

DESCRIPTION OF THE PREFERRED EMBODIMENTS

Figure 1:
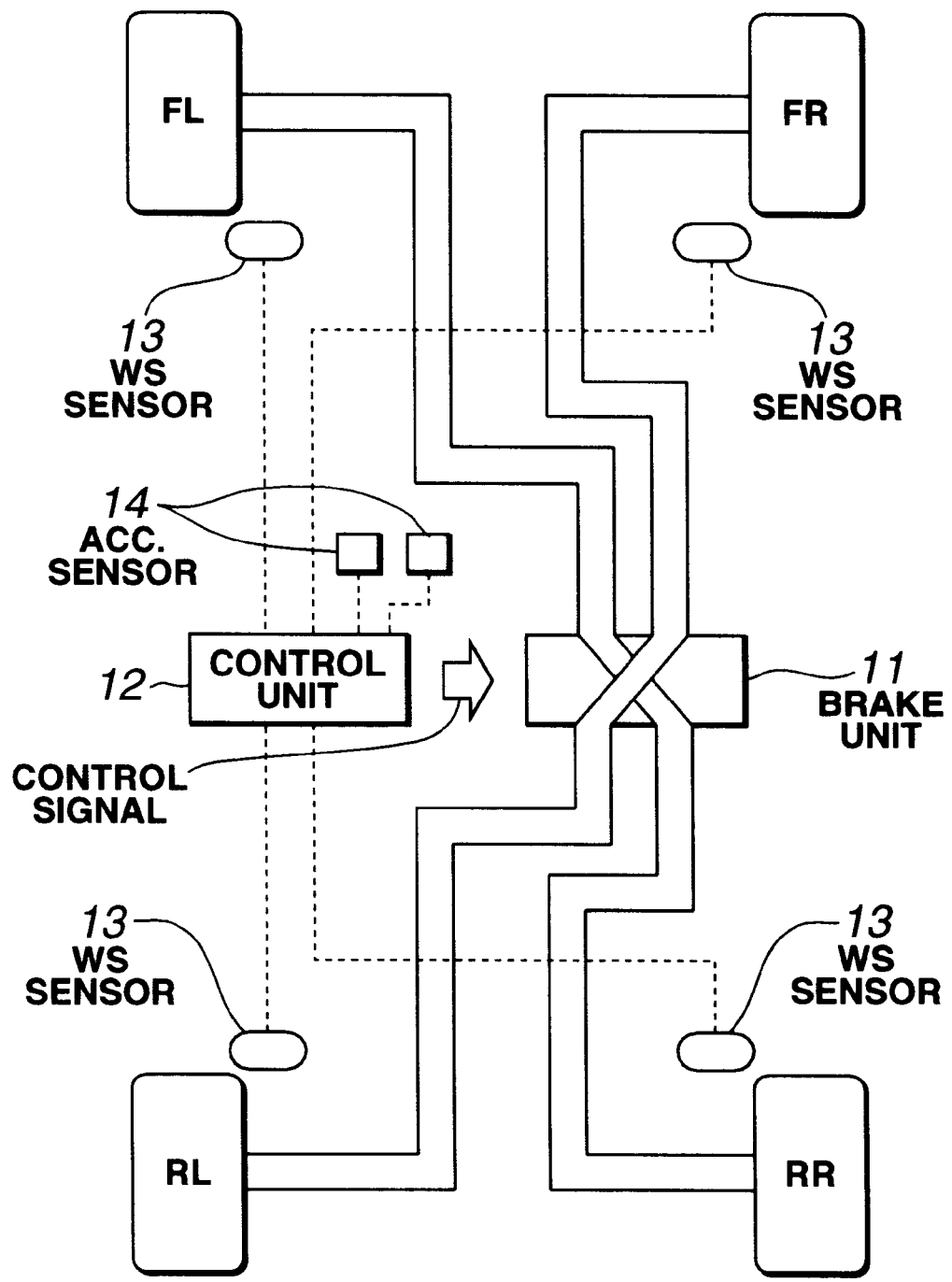
FIG. 1 is a schematic view of an automobile installed with an ABS embodying the present invention.

Referring to FIG. 1, an automobile has a front left road wheel FL, a front right road wheel FR, a rear left road wheel RL, and a rear right road wheel RR. The wheels FL, FR, RL, and RR are equipped with wheel cylinders, respectively, only one of the wheel cylinders being shown at 3 in FIG. 2. All of the wheel cylinders are connected to a brake unit 11, which a master cylinder 1 (see FIG. 2) is connected to.

Wheel speed sensors 13 are operatively coupled with the road wheels FL, FR, RL, and RR, respectively. Each of the wheel speed sensors 13 generates pulses whose frequency is variable with the revolution speed of the corresponding road wheel. The outputs of the wheel speed sensors 13 are fed to a control unit 12 where they are used to determine wheel speeds VFR, VFL, VRR, and VRL. Two longitudinal acceleration sensors 14 are provided.

Referring to FIG. 1, the brake unit 11 is operative in response to control signal to regulate brake pressure within a wheel cylinder of a road wheel to be controlled, and the control unit 12 determines the control signal and applies the control signal to the brake unit 11.

Figure 2:
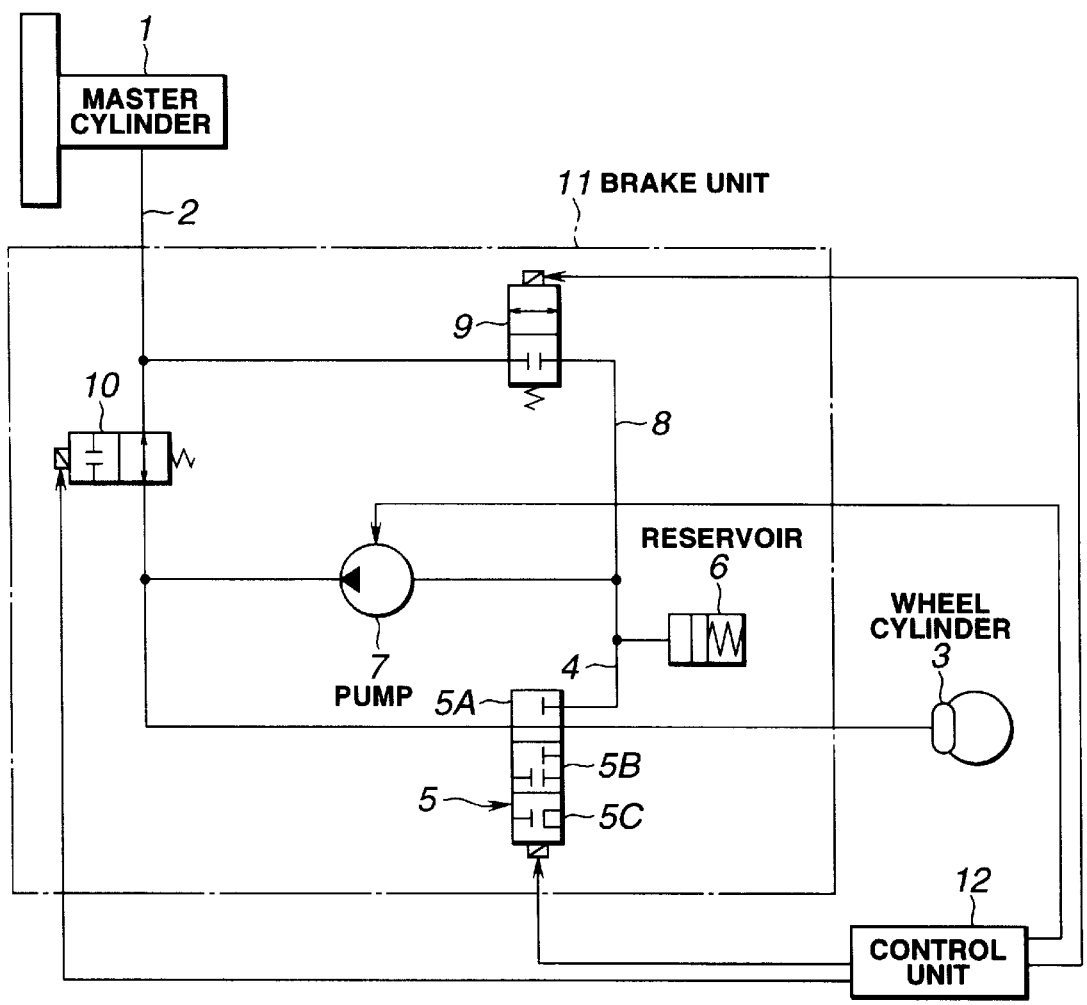
FIG. 2 is a hydraulic circuit of a brake unit.

Referring to FIG. 2, a hydraulic circuit of the brake unit 11 is described. FIG. 2 shows a fragment of the hydraulic circuit that is connected to the wheel cylinder 3 of one of the road wheels. The entire hydraulic circuit of the brake unit 11 is a parallel arrangement of four such fragments.

Manipulating a brake pedal, not shown, by a driver causes the master cylinder 1 to generate pressurized hydraulic fluid. A brake circuit 2 connects the master cylinder 1 to the wheel cylinder 3. A drain circuit 4 is connected to a three-position transfer valve 5, which is fluidly disposed in the circuit 2 to divide same into a master cylinder 1 section and a wheel cylinder 3 section. The transfer valve 5 has three ports, namely, a drain port communicating with the drain circuit 4, a master cylinder side port communicating with the master cylinder 1, and a wheel side port communicating with the wheel cylinder 3. The transfer valve 5 has three positions 5A. 5B, and 5C for establishing a pressure-applying mode, a pressure-holding mode, and a pressure-releasing mode, respectively.

In the position 5A for the pressure-applying mode, the drain port is covered, and both the master cylinder side and wheel side ports are allowed to communicate with each other so that the master cylinder 1 manages the pressure within the wheel cylinder 3. In the position 5B for the pressure-holding mode, the drain port is covered, and both the master cylinder side and wheel cylinder side ports are prevented from communicating with each other so that the wheel cylinder 3 is isolated from each other to hold the wheel cylinder pressure. In the position 5C for the pressure-reducing mode, the master cylinder side port is covered, and the wheel cylinder side port is allowed to communicate with the drain port so that brake oil is discharged via the drain circuit 4 to reduce the wheel cylinder pressure. Thus, shifting the transfer valve 5 to the three positions 5A, 5B, and 5C selectively will control the wheel cylinder pressure.

The drain circuit 4 is provided with an oil reservoir 6 for storage of brake oil. A pump 7 is disposed between the reservoir 6 and the master cylinder section of the brake circuit 2 and operative to deliver the brake oil from the reservoir 6 to the brake circuit 2 at a portion between master cylinder 1 and the transfer valve 5.

At one end, a pressure supply circuit 8 is connected to the master cylinder section of the brake circuit 2 at a portion between the portion at which the pump 7 delivers the brake oil to the brake circuit 2. At the opposite end, the pressure supply circuit 8 is connected to the drain circuit 4 at a portion between the reservoir 6 and the pump 7. A normally closed inlet gate valve 9 is disposed in the pressure supply circuit 8. A normally open outlet gate valve 10 is disposed in the master cylinder side of the brake circuit 2. Specifically, the valve 10 is disposed at a portion between the portion at which the pump 7 delivers the brake oil to the brake circuit 2 and the portion at which the pressure supply circuit 8 is connected to the master cylinder side of the brake circuit 2.

In FIG. 2, the components surrounded by a rectangle drawn by one-dot chain line form a portion of the brake unit 11. The structure of the brake unit 11 is explained per one road wheel in this Figure. Referring to FIG. 1, the entire structure of the brake unit 11 is so designed as to control separately brake pressures of wheel cylinders, not shown, of the road wheels FR, FL, RR and RL.

The transfer valve 5, inlet gate valve 9 and outlet gate valve 10 are solenoid operated valves, respectively. The control unit 12 controls the transfer valve 5, pump 7, inlet gate valve 9, and outlet gate valve 10. As mentioned before, the sensor outputs of the wheel speed sensors 13 and the longitudinal acceleration sensors 14 are fed to the control unit 12. The control unit 12 inputs information of wheel speeds and longitudinal acceleration, which the automobile is subject to and carries out a motion stabilizing control.

The motion stabilizing control is carried out over the whole travelling conditions of the vehicle. The motion stabilizing control may include a torque slip control and/or a yaw rate control. According to the torque slip control, when, at acceleration, at least one of driving wheels slips, it is braked by controlling brake pressure build-up within its wheel cylinder to suppress occurrence of wheel slip. According to the yaw rate control, when, during cornering, under or oversteer tendency occurs, a yawing moment is created in a direction to suppress the tendency by controlling brake pressure build-up within at least one of wheel cylinders. The motion stabilizing control is initiated by operating the pump 7 after closing the outlet gate valve 10 and opening the inlet gate valve 9. The pump 7 delivers brake oil to the transfer valve 5. The transfer valve 5 is operative in response to the control signal to establish the pressure-applying mode, pressure-holding mode, and pressure releasing mode, cyclically, thereby regulating brake pressure within the wheel cylinder of the road wheel to be controlled. The control unit 12 applies the control signal to the transfer valve 5.

Figure 3:
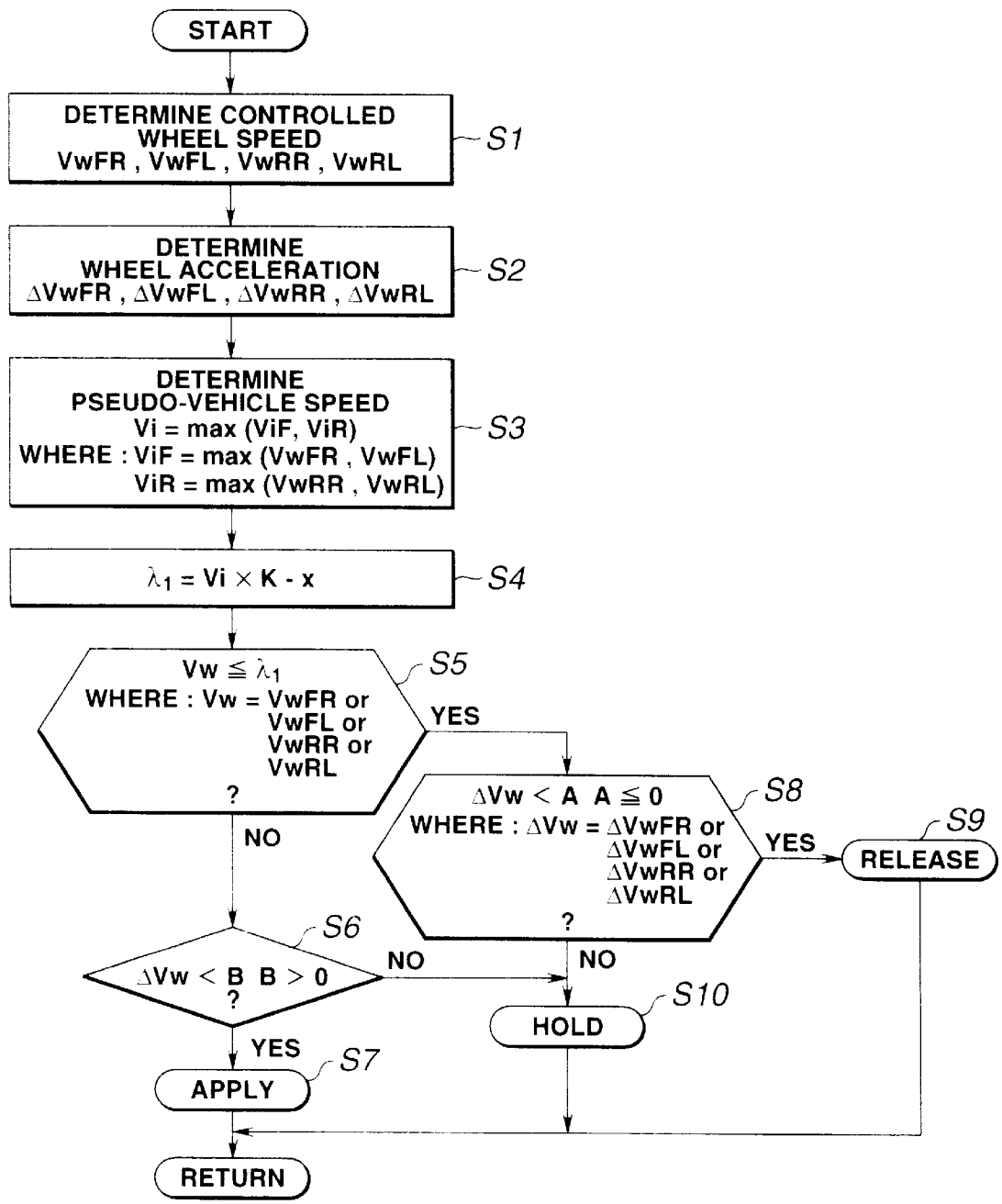
FIG. 3 is a flow chart of an anti-lock control routine.

The flow chart in FIG. 3 illustrates a control routine of an anti-lock control.

Figure 4:
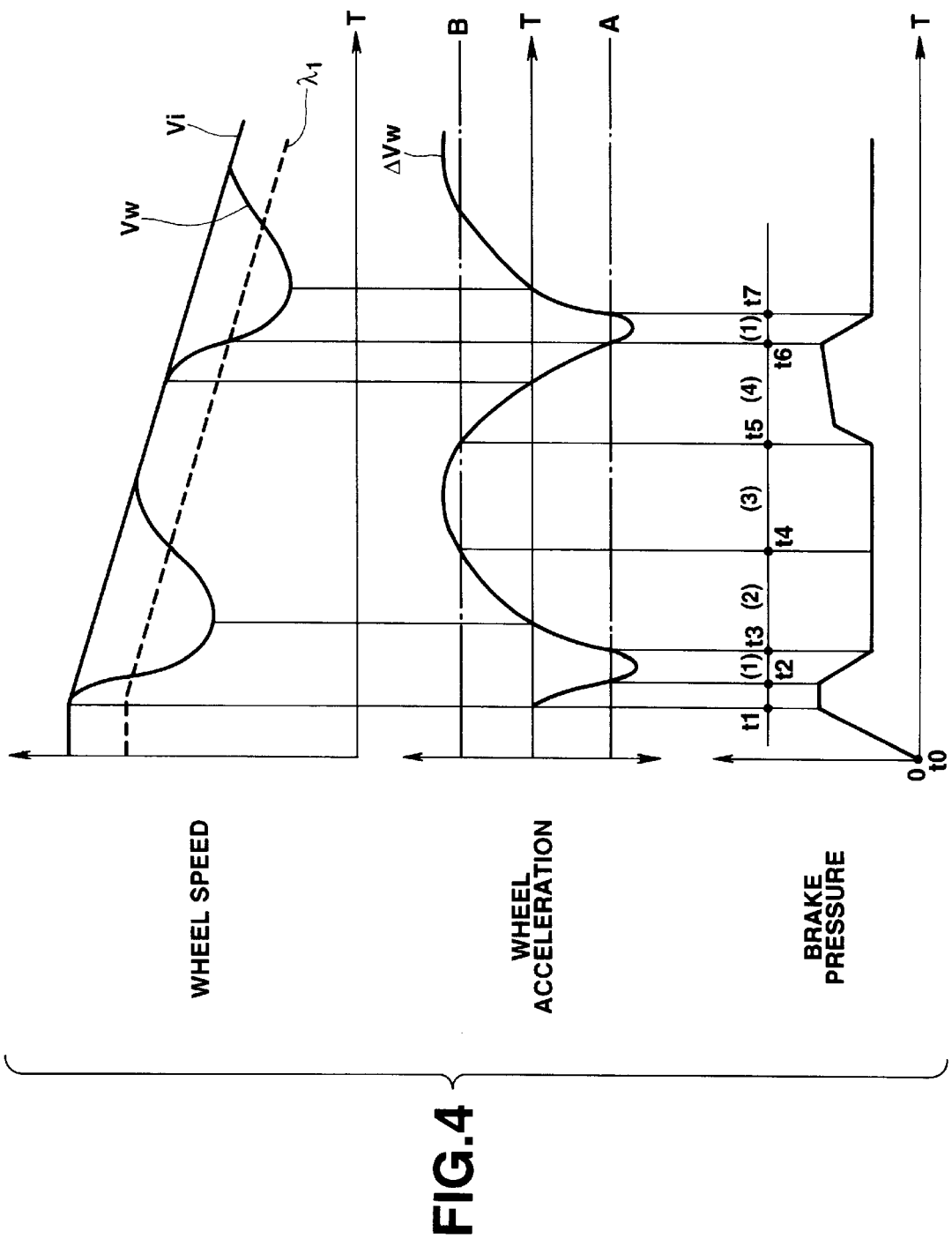
FIG. 4 is a timing chart illustrating operation the antilock control.

In step S1, the control unit 12 executes a sub-routine illustrated by the flow chart in FIG. 4 to determine controlled wheel speeds VwFR, VwFL, VwRL, and VwRR, which are for the front right, front left, rear right and rear left road wheels, respectively.

In step S2, the control unit 12 determines wheel accelerations $\Delta$VwFR, $\Delta$VwFL, $\Delta$VwRR, and $\Delta$VwRL, which are for the front right, front left, rear right, and rear left road wheels, respectively. The control unit 12 derives the wheel accelerations from cycle-to-cycle variations of the controlled wheel speeds, respectively.

In step S3, the control unit 12 determines a pseudo-vehicle speed Vi. In the process, the control unit 12 sets a greater one of VwFR and VwFL as a value ViF (ViF=max (VwFR, VwFL), and a greater one of VwRR and VwRL as a value ViR (ViR=max (VwRR, VwRL). Then, the control unit 12 sets a greater one of the values ViF and ViR as the pseudo-vehicle speed Vi.

In other words, the control unit 12 selects the highest one of the actual wheel speeds of all of the road wheels.

In step S4, the control unit 12 determines a reference value $\lambda1$, which can be expressed by an equation $\lambda1 = Vi \times K - x$. K is a constant that is in the neighborhood of 0.95. x is a value that is in the neighborhood of 8 for high $\mu$ road and 4 for low $\mu$ road.

In step S5, the control unit 12 determines whether or not each of the controlled wheel speeds Vw (Vw=VwFR or VwFL or VwRR or VwRL) is less than or equal to the reference value $\lambda1$. If this is the case (Vw$\leq\lambda1$), the routine proceeds to step S8. If Vw is greater than $\lambda1$, the routine proceeds to step S6.

In step S6, the control unit 12 determines whether or not each of the wheel accelerations $\Delta$Vw ($\Delta$Vw=$\Delta$VwFR or $\Delta$VwFL or $\Delta$VwRR or $\Delta$VwRL) is less than a predetermined positive acceleration value B (B>0). If this is the case, the routine proceeds to step S7. In step S7, the control unit 12 allows the master cylinder 1 to apply brake pressure to the wheel cylinder 3 by causing the transfer valve 5 to take the first position 5A. Thus, if the brake pedal is depressed, the brake pressure within the wheel cylinder 3 increases (apply phase). This value B is set such that when it is not exceeded, the controlled wheel speed Vw is equal to a wheel speed corresponding to the pseudo-vehicle speed Vi, while, when it is exceeded, the wheel speed Vw is increasing toward the wheel speed corresponding to the pseudo-vehicle speed Vi. If, in step S6, the wheel acceleration $\Delta$Vw ($\Delta$Vw=$\Delta$VwFR or $\Delta$VwFL or $\Delta$VwRR or $\Delta$VwRL) is not less than the predetermined value B, the routine proceeds to step S10. In step S10, the control unit 12 causes the transfer valve 5 to take the second position 5B, thereby holding the brake pressure within the wheel cylinder 3 (hold phase).

In step S8, the control unit 12 determines whether or not the wheel acceleration $\Delta$Vw ($\Delta$Vw=$\Delta$VwFR or $\Delta$VwFL or $\Delta$VwRR or $\Delta$VwRL) is less than a predetermined acceleration value A, which is less than or equal to 0 (zero). If this is the case, the routine proceeds to step S9. In step S9, the control unit 12 causes the transfer valve 5 to take the third position 5C, thereby releasing the brake pressure within the wheel cylinder 3 (release phase). The predetermined value A is set such that when it is not exceeded, the wheel tends to be locked, while when it is exceeded, the wheel is released from its locked state and increasing its speed toward the wheel speed corresponding to the pseudo-vehicle speed Vi. If, in step S8, the wheel acceleration $\Delta$Vw is greater than or equal to the predetermined value A, the routine proceeds to step S10 (hold phase).

The control unit 12 repeats execution of the control routine in FIG. 3 upon expiration of 10 milliseconds (ms).

FIG. 4 illustrates variations of controlled wheel speed Vw, wheel acceleration $\Delta$Vw and brake pressure within wheel cylinder. At moment t0, the brake pedal is depressed to initiate braking. After the moment t0, the brake pressure increases to a level corresponding to the degree of depression of the brake pedal. At moment t1, the brake pressure reaches this level and is kept at the level. After the moment t1, the wheel speed Vw and the wheel acceleration $\Delta$Vw decrease. At moment t2, the wheel acceleration $\Delta$Vw becomes less than the predetermined value A immediately after the wheel speed Vw has dropped to the reference value $\lambda1$. Immediately after the moment t2, the control unit 12 causes the transfer valve 5 to take the third position 5C, thereby causing the brake pressure within the wheel cylinder to decrease. This causes the wheel acceleration $\Delta$Vw to increase toward the predetermined value A (A$\leq$0). Immediately after moment t3, the wheel acceleration $\Delta$Vw becomes greater than the predetermined valve A and the control unit 12 causes the transfer valve 5 to take the second position 5B, thereby holding the brake pressure within the wheel cylinder. At moment t4, the wheel speed Vw exceeds the reference value λ1 immediately after the wheel acceleration ΔVw has increased to the predetermined value B. Immediately after the moment t4, the control unit 12 causes the transfer valve 5 to take the second position 5B to maintain the hold phase. This hold phase continues until the wheel acceleration ΔVw drops below the predetermined value B at moment t5. Immediately after the moment t5, the control unit 12 causes the transfer valve 5 to take the first position 5A, thereby causing the brake pressure within the wheel cylinder to increase (apply phase). This apply phase continues until the wheel speed Vw drops to or below the reference value λ1 at moment t6. In this example, the wheel acceleration ΔVw has dropped below the predetermined value A at the moment t6. Thus, upon or immediately after moment t6, the release phase begins. Explaining this timing chart along with the steps of the control routine in FIG. 3, during the period between t0 and t2, the routine proceeds along steps S1 to S5, S6, and S7. During the subsequent period (1) between t2 and t3, the control routine proceeds along steps S1 to S5, S8, and S9 to perform release phase. During the next period (2) between t3 and t4, the control routine proceeds along steps S1 to S5, S8, and S10 to perform hold phase. During the period (3) between t4 and t5, the control routine proceeds along steps S1 to S5, S6, and S10 to continue to perform the hold phase. During the period (4) between t5 and t6, the control routine proceeds along steps S1 to S5, S6, and S7 to perform apply phase.

The flow chart in FIG. 5 illustrates the before-mentioned sub-routine of the preferred implementation of the present invention for determining controlled wheel speeds VwFR, VwFL, VwRR, and VwRL, which are required in step S1 in FIG. 3.

In step S11, the control unit 12 inputs information as to actual wheel speeds VFR, VFL, VRR, and VRL after performing reading operation of the sensor output from each wheel speed sensors 13. VFR indicates the wheel speed of the front right road wheel. VFL indicates the wheel speed of the front left road wheel. VRR indicates the wheel speed of the rear right road wheel. VRL indicates the wheel speed of the rear left road wheel.

In step S12, the control unit 12 performs filtering operation on the input information in step S11 to remove noise.

In step S13, the control unit 12 sets VFR as the controlled wheel speed VwFR for the front right road wheel FR and VFL as the controlled wheel speed VwFL for the front left road wheel FL.

In step S14, the control unit 12 selects a higher one of VFL and VRL and selects a lower one of the selected higher one and VRR, and sets the selected lower one as the controlled wheel speed VwRR for the rear right road wheel RR. The controlled wheel speed VwRR can be expressed by the formula as follows:

VwRR=min {VRR, max (VFL, VRL)}.

In step S15, the control unit 12 selects a higher one of VFR and VRR and selects a lower one of the selected higher one and VRL, and sets the selected lower one as the controlled wheel speed VwRL for the rear left road wheel RL. The controlled wheel speed VwRL can be expressed by the formula as follows:

VwRL=min {VRL, max (VFR, VRR)}.

From the routine in FIG. 5, it is appreciated that the actual wheel speeds VFR and VFL are used as the controlled wheel speeds VwFR and VwFL for the front road wheels. For a rear road wheel on one side, a higher one of actual wheel speeds of road wheels on the opposite side is selected and a lower one of the selected higher one and its actual wheel speed is selected and used as its controlled road wheel VwRR or VwRL.

Figure 6A:
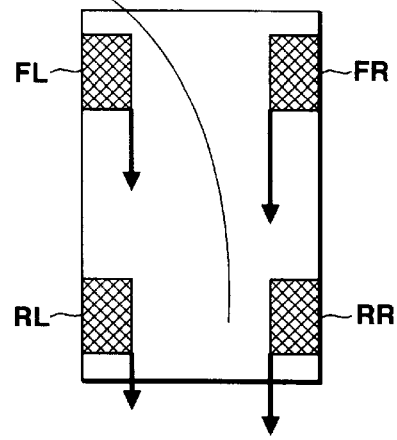
FIGS. 6(a), 6(b) and 6(c) illustrate braking forces applied to road wheels according to system of the present invention under different travelling conditions.
Figure 6B:
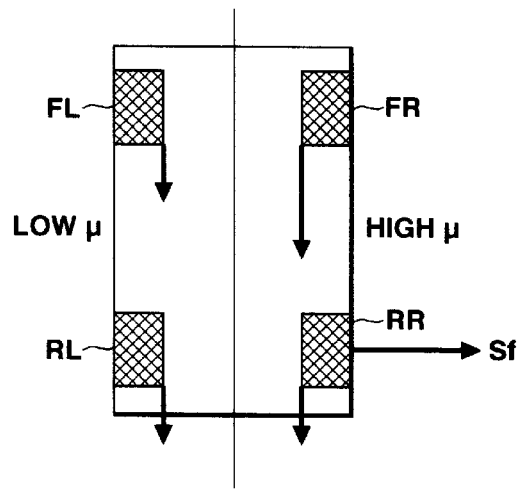
Figure 6C:
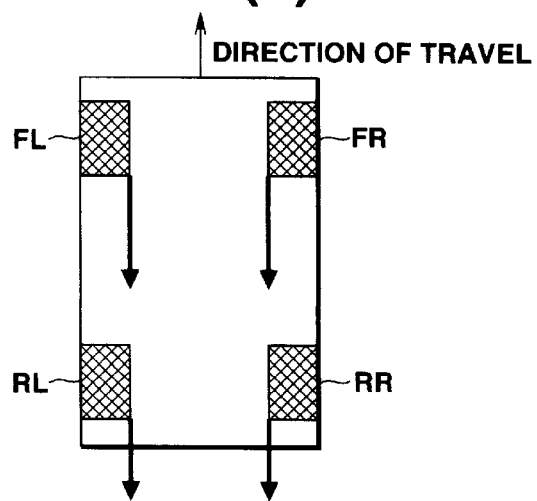

FIGS. 6(a), 6(b) and 6(c) illustrate, in vector, braking forces applied to the road wheels when the braking system of the present invention operates under three different vehicle travelling conditions.

FIG. 6(a) illustrates braking forces to the road wheels in a left turn cornering state.

In this left turn cornering, the rear right road wheel RR and the rear left road wheel RL are outer and inner road wheels, respectively, with respect to the center of radius of the cornering. In this case, the actual wheel speed VFL of the front left wheel FL is selected and used as the controlled wheel speed VwRR for the rear right road wheel RR. This is because VFL is higher than VRL, but lower than VRR.

Using the actual wheel speed VFL of the front left road wheel as the controlled wheel speed VwRR, the braking force applied to the rear right road wheel RR becomes greater than that applied to the rear left road wheel RL.

Figure 7A:
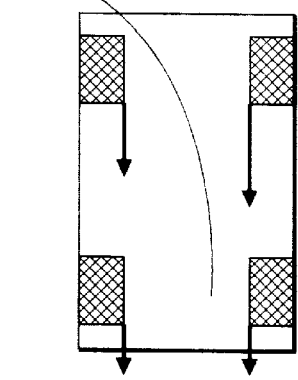
FIGS. 7(a), 7(b), 7(c), 7(d) and 7(e) illustrate braking forces applied to road wheels according to the conventional systems.
Figure 7D:
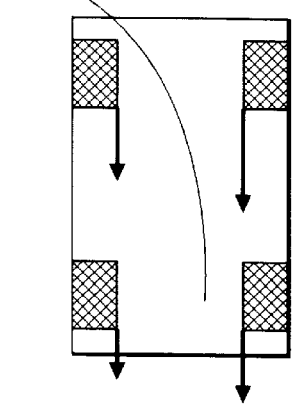

It will be appreciated as an advantage that the braking system of the present invention is free from the before-mentioned shortcoming, as illustrated in FIG. 7(a), of the rear wheel select-low control.

FIG. 6(b) illustrates braking forces applied to the road wheels during braking when the vehicle travels with its left road wheels on low μ road surface and its right road wheels on high μ road surface.

In this case, the actual wheel speed VFL of the front left wheel FL is selected and used as the controlled wheel speed VwRR for the rear right road wheel RR. This is because VFL is higher than VRL, but lower than VRR.

Thus, braking force applied to the rear right road wheel RR is as low as braking force applied to the front left road wheel FL, thereby inducing sufficiently high side force Sf which the rear right rod wheel RR is subject to.

Figure 7B:
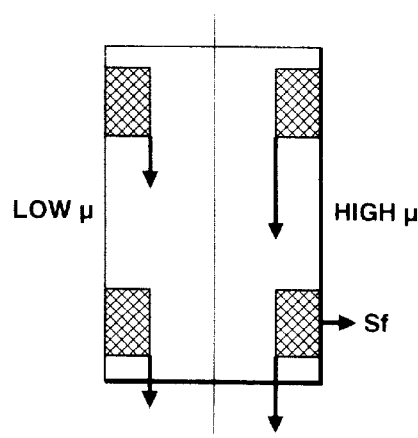
Figure 7E:
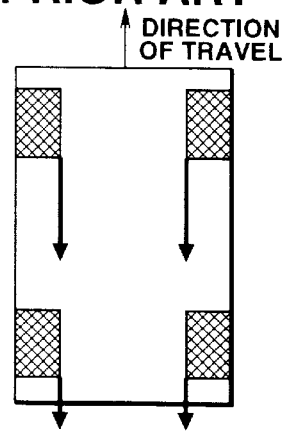
Figure 7C:
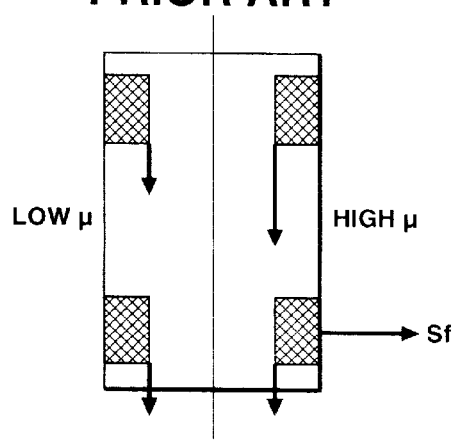

It will be appreciated as an advantage that the braking system of the present invention retains the advantage, as illustrated in FIG. 7(c), derived from the diagonal select-low control. Further, the braking system of the present invention is free from the shortcoming, as illustrated in FIG. 7(b), of the rear wheel select-low control.

FIG. 6(c) illustrates driving forces during braking when the vehicle is travelling in a straightforward direction.

In this case, the actual wheel speeds VRR and VRL are set as the controlled wheels speeds VwRR and VwRL for the rear right and left road wheels, respectively.

Thus, sufficiently high braking forces are applied to the rear road wheels regardless of variations in wheel speeds of the front road wheels.

It will be appreciated as an advantage that the braking system of the present invention is free from the shortcoming, as illustrated in FIG. 7(e), of the diagonal select-low control.

What is claimed is:

1. An anti-lock braking system for an automobile having a front right road wheel, a front left road wheel, a rear right road wheel, and a rear left road wheel, the braking system comprising:

a wheel cylinder for one of the road wheels to be controlled;

a brake unit operative in response to a control signal to regulate brake pressure within said wheel cylinder; and a control unit operative to apply said control signal to said brake unit, said control unit being operative to determine a controlled wheel speed for the one road wheel to be controlled, said control unit being operative to compare said controlled wheel speed with a reference value, said control unit being operative to develop said control signal in response to result from comparing said controlled wheel speed with said reference value;

wherein said control unit is operative to select a higher one of the actual wheel speeds of road wheels on the opposite side, with respect to a longitudinal center line of the automobile, to the side where the one road wheel to be controlled exists, said control unit is operative to select a lower one of said selected higher one actual wheel speed and the actual wheel speed of the one road wheel to be controlled, and said control unit is operative to set said selected lower one actual wheel speed as said controlled wheel speed.

2. The braking system as claimed in claim 1, wherein the one road wheel is a selected one of the rear right road wheel and the rear left road wheel.

3. The braking system as claimed in claim 1, further comprising wheel speed sensors for providing sensor outputs indicative of the actual wheel speeds of the road wheels, respectively.

4. The braking system as claimed in claim 1, wherein said control unit is operative to select the highest one of the actual wheel speeds of all of the road wheels, said control unit is operative to set the selected highest one actual wheel speed as a pseudo-vehicle speed, and said control unit is operative to determine said reference value in a manner determined as a function of said pseudo-vehicle speed.

5. The braking system as claimed in claim 4, further comprising a master cylinder.

6. The braking system as claimed in claim 5, wherein said brake unit interconnects and is fluidly disposed between said master cylinder and said wheel cylinder, and wherein said brake unit includes a transfer valve having a first position for establishing a pressure-applying mode, a second position for establishing a pressure-holding mode, and a third position for establishing a pressure-releasing mode.

* * * * *